(12) United States Patent
Stark

(10) Patent No.: US 8,677,914 B2
(45) Date of Patent: Mar. 25, 2014

(54) METHOD AND DEVICE AT A PLANTER OR A SEED DRILL

(75) Inventor: Crister Stark, Väderstad (SE)

(73) Assignee: Vaderstad-Verken Aktiebolag, Vaderstad (SE)

( * ) Notice: Subject to any disclaimer, the term of this patent is extended or adjusted under 35 U.S.C. 154(b) by 0 days.

(21) Appl. No.: 13/515,736

(22) PCT Filed: Dec. 17, 2010

(86) PCT No.: PCT/SE2010/051415
§ 371 (c)(1),
(2), (4) Date: Jul. 9, 2012

(87) PCT Pub. No.: WO2011/078768
PCT Pub. Date: Jun. 30, 2011

(65) Prior Publication Data
US 2012/0260835 A1 Oct. 18, 2012

(30) Foreign Application Priority Data

Dec. 23, 2009 (SE) .................................... 0951021-5

(51) Int. Cl.
*A01C 7/06* (2006.01)
*A01C 21/00* (2006.01)

(52) U.S. Cl.
USPC ........... 111/121; 111/127; 111/129; 111/200; 111/900; 111/903; 111/922

(58) Field of Classification Search
USPC ......... 111/199, 200, 900, 903, 904, 922, 118, 111/129, 120–127; 701/50; 405/154.1, 405/174–176, 180, 181
See application file for complete search history.

(56) References Cited

U.S. PATENT DOCUMENTS

| 5,852,982 A | 12/1998 | Peter |
| 2004/0231575 A1 | 11/2004 | Wilkerson et al. |
| 2007/0193483 A1 | 8/2007 | Conrad |

FOREIGN PATENT DOCUMENTS

| CA | 2565030 A1 | 4/2008 |
| EP | 0404241 A1 | 12/1990 |

*Primary Examiner* — Christopher J Novosad
(74) *Attorney, Agent, or Firm* — Birch, Stewart, Kolasch & Birch, LLP

(57) ABSTRACT

The invention refers to a method at a seed drill (1) or a planter for placing seeds (27) in the soil. According to the invention the steps executed are that each seed fed out is detected, its placement site in the soil is determined through detection and at least one compound (26, 28) is placed intermittently at at least one predetermined placement site in relation to the specific placement site of each seed. The invention also refers to a device (4) for execution of the method.

20 Claims, 3 Drawing Sheets

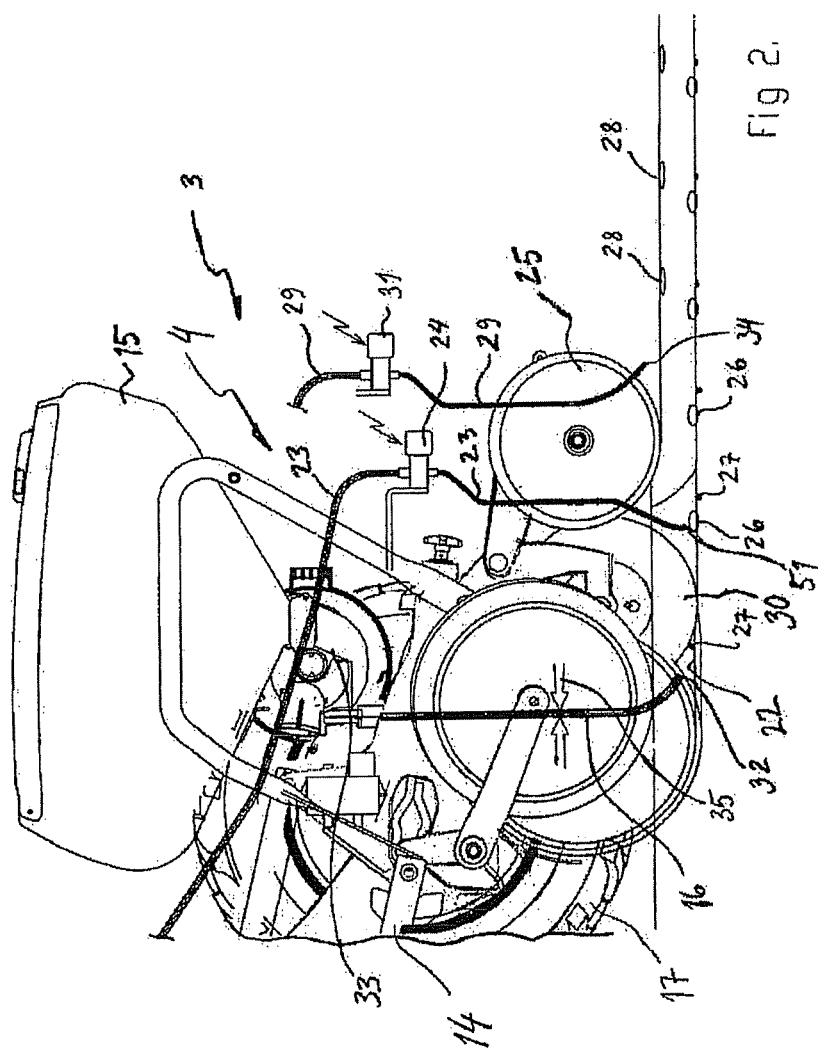

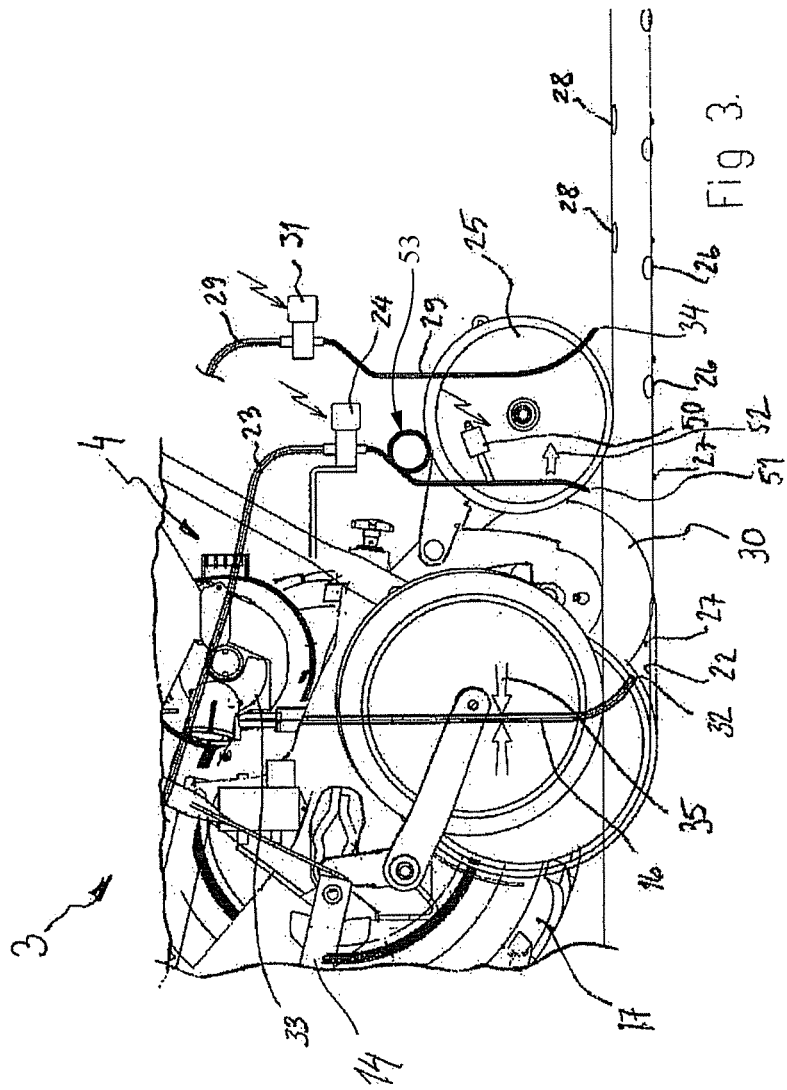

METHOD AND DEVICE AT A PLANTER OR A SEED DRILL

The present invention refers to a method at a planter or a seed drill to place fertiliser and/or chemical at placement of seed according to the ingress of Claim 1. The invention also refers to a device for the execution of the method according to the pre-characterising portion of Claim 5.

BACKGROUND OF THE INVENTION

For a long time drilling has been combined with the farmer simultaneously laying down fertiliser and possibly one or more other chemical compounds in the soil. The seeds are laid down with a seed drill or more often in this context with a precision seed drill or planter. In the following the implement is referred to by the American term planter, which is also an accepted term in the rest of the world.

A planter sows or sets seeds of crops such as maize, sugarbeet, cotton, sunflower etc. in seed rows which lie at a distance from each other commonly of approx. 20 to approx. 100 cm. The individual seeds are placed in the seed rows at a distance that is commonly 10-20 cm from each other, meaning that approx. 10-20 seeds are fed out per second from each of the constituent so-called row entities in the planter. The fertiliser is sometimes placed directly in the seed row, which poses a risk since the fertiliser and then particularly the nitrogen (N) tend to scorch the little seedling that grows out, wherein the plant dies or is weakened. It is often better to lay the fertiliser in a separate row that is usually laid approx. 5 cm from the seed row. The fertiliser can well be placed a few cm deeper than the seed. The seed, for example maize grains, is usually placed at approx. 5 cm depth. For different crops different predetermined sowing depths apply. Climate zones, different regions, seasons, weather conditions, soil type etc. can also affect the choice of sowing depth. Chemical compounds to prevent different plant diseases, combat pests or weeds etc. can also be laid out at sowing. These chemical compounds are often placed in the seed row, sometimes above the soil surface, depending on the aim of the treatment. How common this is depends on many factors such as amount of weeds, infections in the soil, climate zone conditions etc. The compounds applied can be dry and granular, in powder form or in liquid form. In certain regions, for example in North America, liquid or gaseous (gasified liquid ammonia) fertiliser is used on a large scale.

It is often a waste and unnecessary environmental impact to lay fertiliser and/or one or several chemicals in an uninterrupted row or string since there is approx. 20 cm between every seed. This also leads to nutrients being unnecessarily accessible to weeds.

OBJECT OF THE INVENTION

The object of the invention is to devise a method and a device at a planter or a seed drill or similar agricultural implement, whereby the abovementioned problems are minimised and to provide a method and a device which are cost-effective, reliable in operation and environmentally appropriate.

SUMMARY OF THE INVENTION

This object is achieved through a method according to the characterising portion of Claim 1.

A device for the execution of the method has been given the characteristics presented in Claim 5.

The sub-claims describe advantageous embodiments of the invention.

Through the method and the device according to the invention the different chemical compounds are guided to optimal placement in relation to the respective compound and every seed.

A planter that sows or sets seeds in a predetermined manner in a known way is provided with a device according to the invention in order to carry one or more chemical compounds and a device that with great precision applies the chemical compound or the chemical compounds in a predetermined way in relation to in principle every seed (for example maize seeds), i.e. the compound is applied intermittently. This means that considerable environmental benefits can be made through that the amount of fertiliser compound and/or chemical compound can be decreased. This also leads to considerable financial savings for the farmer. The solution can include laying out certain fertiliser and certain compounds intermittently in relation to the seeds and laying out other compounds continuously at the same time in at least one string or one band.

SUMMARY OF THE DRAWINGS

The invention is described in more detail below with reference to the attached drawings, which show preferred embodiments.

FIG. 2 shows an enlarged detail in side view of the row entity in FIG. 1 with the device according to the invention.

FIG. 3 shows a further enlarged detail in side view similar to that in FIG. 2 of a second embodiment of a row entity with a device according to the invention.

DETAILED DESCRIPTION

Figure 1:
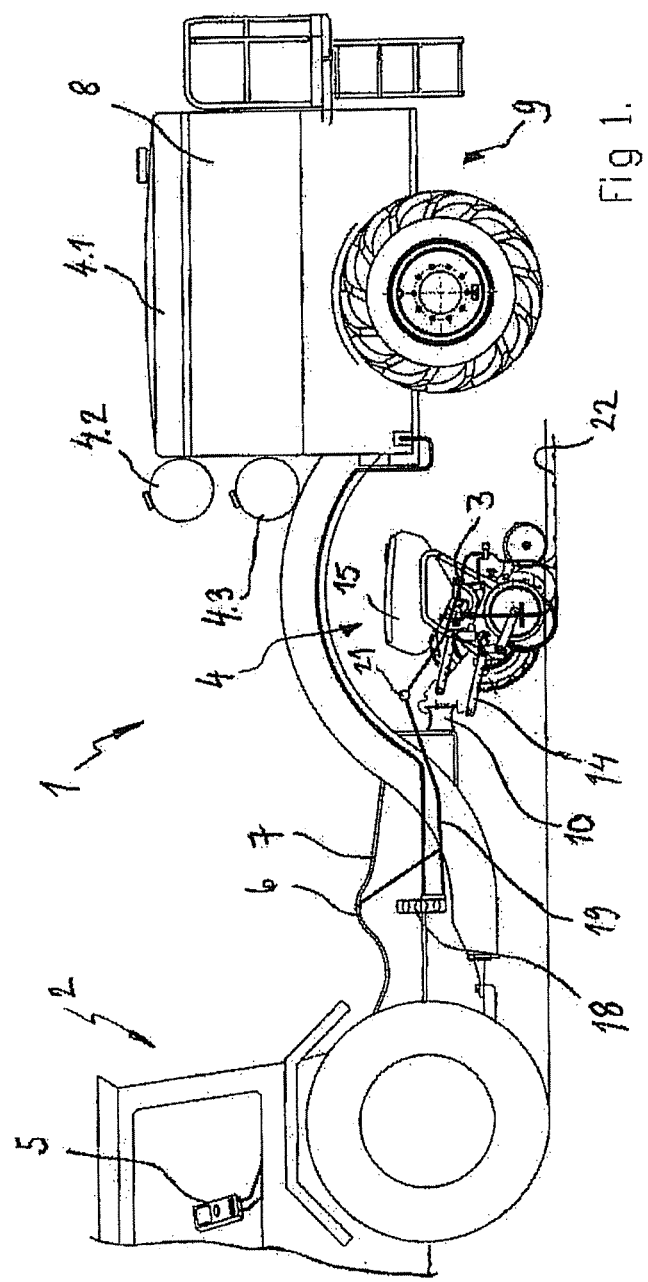
FIG. 1 shows a side view of a planter, which has a cart with fertiliser tank and is drawn by a partially shown tractor, wherein the planter comprises a first embodiment of a row entity with a device according to the invention including one or more containers for chemical compounds.

Similar parts/details in the embodiments described and depicted in the drawings have been given the same reference number.

FIG. 1 shows a planter or seed drill 1. The planter 1, which is drawn by a tractor 2, comprises a plurality of row entities 3 arranged side by side and connected to a feed device 4 according to the invention comprising containers 4.1, 4.2, 4.3 for known chemical compounds for preventing various plant diseases, controlling pests or weeds etc. The feed device 4 is manoeuvred electrically from an in the tractor cab suitably positioned control entity 5, which can also be provided with a display where the functions of the planter 1 can be monitored by the farmer. Through this control entity 5 the farmer can e.g. set where fertiliser and or the chemical compound should be placed in relation to the sown seed. The system is adapted to automatically compensate for speed variations according to predetermined conditions.

The feed device 4 according to the invention is also manoeuvred with a number of hydraulic connections 6 and electric cables 7 and is also provided with a tank 8 for fertiliser. This tank 8 can either be carried on the machine 1 or drawn on a separate cart 9. The containers 4.1, 4.2, 4.3 are also mounted on the cart 9. Alternatively the tank 8 can be carried on the tractor 2. If the tank is carried on the tractor this is commonly done through the arrangement of so-called saddle tanks that are fastened on the sides of the tractor 2. The planter 1 is in a known way provided with the row entities 3 mounted side by side on frame beams 10. The frame beams 10 comprise foldable sections, which are foldable in a known way, for transport by road and are pivotable at each other in the crosswise direction of the planter 1. The row entities 3 are pivotably connected at the frame beams 10. At the outer beam 10 the outermost row entity 3 is visible (see FIG. 1). The row entities 3 on the frame beams 10 are commonly so constructed that the row spacing is adjustable, for example between 20 cm-approx. 100 cm. This adjustability is achieved through the row entities 3 being displaceable in the sideways direction. The planter 1 is provided with at least one hydraulic cylinder in order to be able to fold the sections of the planter 1 for transport by road and/or to set the row spacing (the pivot points of the frame beams and the hydraulic cylinders are not shown in the drawings). The row entities 3 are connected to the frame beams 10 in such a way that they follow irregularities of the soil, for example through a shown parallelogram at 14. Each row entity 3 can be supplied with seed in different ways, such as with the shown embodiments by means of a tube 16 extending from a container 15 (see FIGS. 2 and 3). The frame beams 10, which together can have a considerable extension in the crosswise direction, usually have at least one wheel 17 at each side to keep the frame beams at a certain height over the soil. The feed device 4 according to the invention has at least one pump 18 for pressurising the fertiliser and the chemical compound/s from the tank 8 and the containers 4.1, 4.2, 4.3. The pump 18 is powered in this embodiment by the power take-off of the tractor 2. The pump 18 feeds fertiliser and/or the chemical compound through pressure tubes 19. In the pressure tubes 19 the compound is conducted to distribution pipes 21, which extend in the crosswise direction of the planter 1 to a place where the tubes to each individual row entity 3 are connected. To a seed furrow 22 from the distribution pipes 21 tubes 23 lead from the tank 8 of fertiliser and tubes 29 from the containers 4.1, 4.2, 4.3 of the chemical compound/s. The tubes 23 and 29 pass valves 24 and 31 respectively, which are adapted to mutually electrically open and close the flow in relation to the specific placement site of the seeds 27 in the soil. The tubes 23 and 29 extend down to mutually predetermined positions relative to the placed seeds 27 in the seed furrows 22 in the soil, but can also extend on to other intended positions. The seed furrow 22 is closed by a closer wheel 25, wherein both the fertiliser 26 and the seeds 27 achieve good contact with the soil. 30 denotes a wheel that stops each seed 27 and presses them firmly in intended places in the bases of the seed furrows 22. The pump 18 can be replaced by or complemented with a fan for pneumatic transport of dry fertiliser or chemical compound, i.e. in granular and/or in powder form.

FIG. 2 reveals more clearly the transport through the tubes 16, 23 and 29 mounted on the individual row entities 3 of seeds 27, fertiliser 26 and chemical compound 28. The tubes 23 run via the valves 24 down after the tubes 16 for feeding of seeds 27 for dosing of fertiliser 26, which is placed in the soil in a certain predetermined distance relationship to the specific position of the seeds 27. The tubes 29 which are arranged after the respective tube 23 also each have their own valve 31 for controlled dosage of the chemical compounds. It is obvious that a row entity 3 can exhibit more tubes than the shown tubes 23 and 29 for transport of a selection of substances to predetermined positions in relation to seeds 27 transported through the tube 16 and positioned. The tubes can also be combined with other valves so that more than one chemical is conducted though a single tube.

The tube 16 leads down from a singulator or seed distribution device 33 and places singulated seeds 27 one by one in the seed furrow 22. The tube 16 is provided with a detector 35, for example a photocell, which is suitably positioned as far down as possible on the tube 16, since this allows more accurate detection of the placement site that an actual seed 27 acquires in the soil and which fertiliser and/or the chemical compounds should be placed in relation to. Below the lower opening 32 of the tube 16 is shown a seed 27, which has just left the tube 16. This seed is prevented from rolling by being pressed firmly into the bottom of the seed furrow 22 by means of the wheel 30. The fertiliser 26 is then placed intermittently at the intended placement site in the soil relative to the placement site of the seeds 27 in question. Dabs of the chemical compound 28, which have been fed out of the opening 34, have thereafter also been placed intermittently at an approximate predetermined distance from the seeds 27.

FIG. 3 shows a second embodiment of a device according to the invention where a servo device or an adjustment apparatus 50 is adapted at the instant in which the pressure pulse with fertiliser 26 arrives at the mouth 51 to move the tube 23 backwards in the direction of the arrow 52 at approximately the speed that the planter 1 is moving forwards so as during a moment of time to keep the movement of the mouth 51 relative to the soil surface close to zero. Through this the device 3 according to the invention can very concentratedly place the fertiliser 26 with great precision relative to the placement of the seed 27 in the seed furrow 22. The arrangement of a moveable mouth can also be applied to the mouth 34 of the pipe 29 for the chemical compound (not shown). This shown adjustment apparatus 50 can be an electromagnet, which is controlled by an electric voltage that is ramped up in such a way that the movement corresponds to the movement of the planter 1 over the soil. With changes in speed the ramping up/down can be altered electronically so that the movements of the tubes 23 and/or 29 relative to the soil become close to zero at application of the fertiliser and the chemical compound. This technique can also be used for granulated fertiliser or in order to place seeds with great accuracy in the soil. At 53 it is shown that the tube 23 has been coiled to achieve a recoiling action, so that the mouth 51 of the pipe 23 is restored automatically to the starting position. For rapid restoration of the tube 23 to the starting position, a simple, not shown spring can also be sufficient. Many different machine elements can come into question here for the composition of the planter 1.

The function of the device according to the invention at a planter 1 is according to following:
1. The position of a seed 27, which is to be inserted into the seed furrow 22, is detected in the tube 16 by means of a detector 35, for example a photocell with IR-light.
2. The valve 24 on the tube 23, the mouth 51 of which opens in the area at the seed furrow 22, and the valve 31 on the tube 29, the mouth 34 of which opens above the bottom of the seed furrow 22, both open at predetermined points in time in relation to the detected passage of the seeds 27 past the detector 35 so that fertiliser 26 and at least one chemical compound 28 will be fed out, preferably intermittently, to a predetermined position in relation to the placed seed 27 (or in relation to another seed, such as an anterior or a posterior seed). The valves 24 and 31 are each kept open a predetermined period of time so that the correct amount of fertiliser 26 and compound 28 will be supplied to the area.
3. The system has a device, such as a pump 18, that pressurises the fertiliser and the chemical compound/s. This pressure can be pre-set and it can be regulated in order to be adapted to the progress speed of the planter 1 with the aim of supplying the desired amount of fertiliser and chemical compound even when the speed is increased or decreased. There can be need to increase the pressure to a considerable extent since at increasing speed there can be a need to open the valves for a shorter period of time in order to continue to place the fertiliser and/or the chemical compound within the desired area even when the speed is increased. Naturally the fed amount can be varied through controlling the open time of the valves. The fed amount can e.g. be controlled through controlling the pressure, the dimensions and length of the tubes, the time that the valves are open, the viscosity of the fertiliser and/or the chemical compound, the capacity of the pressurising device etc. Through controlling the mechanism 50, which moves the mouths 51 of the tubes 23, the fertiliser and/or the chemical compound can be placed on a predetermined limited area, i.e. if the tube for an instant stands still or almost still in relation to the soil the compound can be applied more concentratedly. The placement of the fertiliser 26 can be executed through a mechanical displacement of the tube mouth 51, but it can also be executed through the fertiliser acting as pressure medium for a cylinder, bellows or similar, i.e. the pressure impulse displaces the tube 23 in order to give the pipemouth 51 a decreased speed relative to the soil. The curvature or coiled shape of the tube 23 can be adapted to achieve an optimal function.

The seed distribution device 33 of the row entities 3 for feeding of seeds 27 through the tubes 16 commonly serve a relatively large number of side by side arranged seed rows 22 in order to give the planter 1 a desired working width and thereby desired work capacity. Commonly each row entity 3 has a separate seed distribution devices 33 in order in a known way to separate or singulate the seeds with a plate or a drum that is subjected to a positive or negative pressure so that one seed at a time is held fast at a hole in a hole row. The seeds 27 are brought to leave the drum or plate at a predetermined instant and are then delivered down into the seed furrow 22 where each seed 27 is placed at a predetermined set sowing depth. When the seed 27 is placed in the seed furrow 22 it is commonly closed and the soil is pressed down over the seed with some form of implement, such as one or two wheels 25, in order for the seed 27 to have good contact with and be placed accurately in the soil and for the soil's moisture to come into contact with the seed as quickly as possible in order to get it to germinate.

The detection through the detector 35 is often linked to the control entity 5 with display in the cab of the tractor 2, by which the driver can monitor sowing so that it occurs in a satisfactory way. The closer to the seed furrow 22 the photocell 35 is placed, the more accurately the position of the seed 27 in the soil can be determined With a modified embodiment it can be arranged that holes in the plate or the drum of the seed distribution devices 33 or the angled position of the plate or the drum can be detected and on the basis of this the dosing of the compound is regulated. With this embodiment it is however more difficult to place the compound with sufficient precision in an intended place.

The device 4 according to the invention is not limited to the tank 8 and the containers 4.1, 4.2, and 4.3 that are shown in the drawings, but can be varied with respect to the desired treatment of the soil. For example this type of planter 1 can be equipped with a device 4 according to the invention comprising a container 8 for liquid fertiliser or alternatively a container for granulated fertiliser and in addition a not shown tank for water. During driving it can be so arranged that water and the granulated fertiliser are mixed, whereby the granulated fertiliser, preferably in the form of urea, is dissolved in the water and becomes liquid fertiliser. The device 4 according to the invention can furthermore be provided with at least one container 4.1, 4.2, and 4.3 for liquid pesticide compound, crop protection compound or other chemical substance (chemical or chemical compound). It can also be possible within the framework of the invention to mix fertiliser and chemical compound before placement in the soil.

Furthermore, the planter 1 can be equipped with a device for pressurising the liquidised chemical compounds and at least one row entity is provided with a tube 23, 29 for transporting fertiliser/chemical compound to the area at the seed furrow 22. The tubes 23 can also be drawn so that the fertiliser is placed on the soil surface in relation to the sown seed 27. In an embodiment of the device 4 according to the invention the pipe 23 discharges into the seed furrow 22 just above its bottom and the fertiliser 26 impacts with such force down into the soil that it is forced down under the bottom of the seed furrow 22. The fertiliser 26 can then be injected into the soil deeper than the seed furrow 22 has been formed. The mouth 51 of the tube 23 can be provided with a not shown end part or nozzle, which is adapted to increase or decrease the speed of the fertiliser 26 depending on the effect to be achieved. A row entity 3 can exhibit several tubes 23 that supply different fertiliser in different relations to a seed. In the same way a row entity 3 can exhibit several tubes 29 that supply different chemical compounds 28 in different relations to a seed.

The tubes 23 can be provided with valves 24 so that liquid fertiliser 26 is conducted out in a predetermined manner to the area at a seed 27. Certain chemical compounds 28 can be relevant to apply to the seed 27, for example some form of dip compound or compound against pests, for example slugs or flea beetles.

Furthermore, the machine 1 can be provided with a system, that sets the fertiliser and/or the liquid chemical compound/s under a predetermined pressure, which can be variable, for example depending on the progress speed of the planter 1.

The hydraulic system of the tractor 2 can be used to generate the pressure. Alternatively the power takeoff of the tractor can power the pump device 18. Certain tractors 2 are equipped to power functions electrically with three-phase alternating current. Such a power source can also be used.

The chemical compound can be liquid or in granular form. The planter 1 can thus be built to handle granulated (dry) compound, such as fertiliser and granulated or powdered pesticide compound and similar.

Other solid substances can be used, as can a combination of liquid and solid compounds. The drawings and the description describe two embodiments where the fertiliser is placed at the seeds and the chemical compound/s are placed at a separate place from that, for example on another level in the soil. Within the framework of the claims fertiliser and chemical compound, such as mentioned above, are placed at other places than these. For example the chemical compound could be placed at the seeds and the fertiliser instead of at a predetermined distance from these. Many similar combinations can thus be possible. Modifications, such as combinations of the described embodiments, are naturally also possible within the scoop of the attached claims.

The invention claimed is:

1. A method for a seed drill or a planter for placing seeds in soil, comprising:
   detecting each seed that is fed out and determining a placement site for each seed in the soil through the detection, and
   placing fertiliser and or at least one chemical compound intermittently at an approximate predetermined distance from the placement site of each seed, wherein a mouth of at least one transport tube for said fertiliser and/or said at least one chemical compound is positioned relative to placement of the seeds in the soil and is moved such that the speed of said mouth relative to the soil is decreased.

2. The method according to claim 1, wherein said at least one transport tube can be restored automatically to a stalling position by coiling to achieve a recoiling action or by means of a spring.

3. The method according to claim 2, wherein a plurality of chemical compounds are laid out simultaneously and continually, in the form of a string or band; at a predetermined distance from the specific placement site of each seed.

4. The method according to claim 2, wherein a valve is regulated such that after each seed has been placed at a specific site in a seed furrow by means of said detection, said fertiliser and/or said at least one chemical compound is placed at at least one predetermined placement site relative to each seed.

5. A feed device for execution of the method for the planter or seed drill for placing seeds in the soil according to claim 2, said feed device being provided with control members in order to detect each fed seed and intermittently place at least one compound at an approximate predetermined distance from the specific placement site of each seed, wherein said control member is arranged to control the mouth of at least one transportation tube for said fertiliser and/or said at least one chemical compound such that said mouth is positioned relative to placement of the seeds in the soil and is moved in order to decrease the speed of said mouth relative to the soil.

6. The method according to claim 1, wherein a plurality of compounds are laid out simultaneously and continually in the form of a string or band, at a predetermined distance from the specific placement site of each seed.

7. The method according to claim 6, wherein a valve is regulated such that after each seed has been placed at a specific site in a seed furrow by means of said detection, said fertiliser and/or said at least one chemical compound is placed at at least one predetermined placement site relative to each seed.

8. A feed device for execution of the method for the planter or the seed drill for placing seeds in the soil according to claim 6, said feed device being provided with control members in order to detect each fed seed and intermittently place at least one compound at an approximate predetermined distance from the specific placement site of each seed, wherein said control member is arranged to control the mouth of at least one transportation tube for said fertiliser and/or said at least one chemical compound such that said mouth is positioned relative to placement of the seeds in the soil and is moved in order to decrease the speed of said mouth relative to the soil.

9. The method according to claim 1, wherein a valve is regulated such that after each seed has been placed at a specific site in a seed furrow by means of said detection, said fertiliser and/or said at least one chemical compound is placed at at least one predetermined placement site relative to each seed.

10. A feed device for execution of the method for the planter or the seed drill for placing seeds in the soil according to claim 9, said feed device being provided with control members in order to detect each fed seed and intermittently place at least one compound at an approximate predetermined distance from the specific placement site of each seed, wherein said control member is arranged to control the mouth of at least one transportation tube for said fertiliser and/or said at least one chemical compound such that said mouth is positioned relative to placement of the seeds in the soil and is moved in order to decrease the speed of said mouth relative to the soil.

11. A feed device for execution of the method for the planter or a seed drill for placing seeds in the soil according to claim 1, said feed device being provided with control members that detect each fed seed and intermittently place at least one compound at an approximate predetermined distance from the specific placement site of each seed, wherein said control member is arranged to control the mouth of at least one transportation tube for said fertiliser and/or said at least one chemical compound so that said mouth is positioned relative to placement of the seeds in the soil and is moved such that the speed of said mouth decreases relative to the soil.

12. The device according to claim 11, wherein said at least one transport tube can be restored automatically to the starting position by coiling to achieve a recoiling action or by means of a spring.

13. The device according to claim 12, wherein said fertiliser and/or said at least one chemical compound is liquid.

14. The device according to claim 12, wherein said fertiliser and/or said at least one chemical compound is dry, in the form of granulate and/or powder.

15. The device according to claim 11, wherein said fertiliser and/or said at least one chemical compound is liquid.

16. The device according to claim 11, wherein said fertiliser and/or said at least one chemical compound is dry, preferably in the form of granulate and/or powder.

17. The device according to claim 16, further comprising a feeding entity, which is adapted to simultaneously and continually lay out an additional chemical compound, preferably in the form of a string or band, at a predetermined distance from the placement site of each seed.

18. The device according to claim 17, further comprising a feeding entity, which is adapted to simultaneously and continually lay an additional chemical compound, in the form of a string or band, at a predetermined distance from the specific placement site of each seed.

19. The device according to claim 16, wherein said control member comprises a detection member, including a photocell or similar, that senses the position of the seeds in a transport tube, and a valve is arranged on each transport tube for said fertiliser and or said at least one chemical compound, the valve is regulated by said detection member and is adapted to feed said fertiliser and/or said at least one chemical compound to at least one specific placement site relative to the specific placement site of the seeds.

20. The device according to claim 19, further comprising a feeding entity, which is adapted to simultaneously and continually lay an additional chemical compound, in the form of a string or band, at a predetermined distance from the specific placement site of each seed.

* * * * *